(12) United States Patent  (10) Patent No.: US 7,545,611 B2
Lee et al.  (45) Date of Patent: Jun. 9, 2009

(54) ELECTRIC POWER CIRCUIT PROTECTING APPARATUS USING SUPERCONDUCTOR

(75) Inventors: Bang-Wook Lee, Cheongju (KR); Kwon-Bae Park, Daejeon (KR)

(73) Assignee: LS Industrial Systems Co., Ltd., Seoul (KR)

( * ) Notice: Subject to any disclaimer, the term of this patent is extended or adjusted under 35 U.S.C. 154(b) by 133 days.

(21) Appl. No.: 11/551,919

(22) Filed: Oct. 23, 2006

(65) Prior Publication Data

US 2007/0139832 A1  Jun. 21, 2007

(30) Foreign Application Priority Data

Dec. 2, 2005  (KR) ...................... 10-2005-0117238

(51) Int. Cl.
    *H02H 7/00* (2006.01)
(52) U.S. Cl. ....................................................... 361/19
(58) Field of Classification Search ................... 361/19; 327/527
    See application file for complete search history.

(56) References Cited

U.S. PATENT DOCUMENTS

| | | | | |
|---|---|---|---|---|
| 4,467,384 | A * | 8/1984 | Yuasa ........................... | 361/19 |
| 5,218,505 | A * | 6/1993 | Kubo et al. ................... | 361/19 |
| 5,225,956 | A * | 7/1993 | Hara et al. .................... | 361/19 |
| 6,411,479 | B1 * | 6/2002 | Zueger et al. ................. | 361/19 |
| 7,091,799 | B1 * | 8/2006 | Hennessy et al. ............. | 333/12 |
| 2005/0068701 | A1 | 3/2005 | Lee et al. | |

FOREIGN PATENT DOCUMENTS

| JP | 64-012438 | 1/1989 |
|---|---|---|
| JP | 1-185127 A | 7/1989 |
| JP | 2000-294068 | 10/2000 |

OTHER PUBLICATIONS

Translation of JP 2000-294068. Morita et al. Oct. 2000.*
English language abstract of JP 2000-294068.
English language abstract of JP 64-012438.
U.S. Appl. No. 11/427,816 to Lee et al., which was filed on Jun. 30, 2006.
U.S. Appl. No. 11/616,458 to Lee et al., which was filed on Dec. 27, 2006.
English language Abstract of JP 1-185127 A Jul. 24, 1989.

* cited by examiner

*Primary Examiner*—Stephen W Jackson
*Assistant Examiner*—Christopher J Clark
(74) *Attorney, Agent, or Firm*—Greenblum & Bernstein, P.L.C.

(57) ABSTRACT

An electric power circuit protecting apparatus using a superconductor in an electric power system needing re-closing within a predetermined time from fault current blocking, comprising a main circuit breaker; a first superconductor element connected in series to the main circuit breaker; a first auxiliary switch to switch a circuit between the first superconductor element and the main circuit breaker; a second superconductor element connected in parallel to the first superconductor element and the first auxiliary switch; a second auxiliary switch to switch a circuit between the second superconductor element and the main circuit breaker; a first monitoring unit for detecting a voltage across the first superconductor element and for supplying a first switching control signal to the first auxiliary switch to be switched to the circuit open position, and a second switching control signal to the second auxiliary switch to be switched to the circuit close position; and a second monitoring unit for detecting a voltage across the second superconductor element, the second monitoring unit for supplying a second switching control signal to the second auxiliary switch to be switched to the circuit open position, and a first switching control signal to the first auxiliary switch to be switched to the circuit close position.

4 Claims, 3 Drawing Sheets

FIG. 2

|  | NORMAL CURRENT | 1st FAULT CURRENT | 2nd FAULT CURRENT |
|---|---|---|---|
| MAIN CIRCUIT BREAKER | CLOSE | CLOSE AFTER OPENING | CLOSE AFTER OPENING |
| 1st AUX.SW | CLOSE | OPEN AFTER MAIN CIRCUIT BREAKER OPEN | CLOSE AFTER MAIN CIRCUIT BREAKER OPEN |
| 2nd AUX.SW | OPEN | CLOSE AFTER MAIN CIRCUIT BREAKER OPEN | OPEN AFTER MAIN CIRCUIT BREAKER OPEN |

ELECTRIC POWER CIRCUIT PROTECTING APPARATUS USING SUPERCONDUCTOR

RELATED APPLICATION

The present disclosure relates to subject matter contained in priority Korean Application No. 10-2005-0117238, filed on Dec. 2, 2005, which is herein expressly incorporated by reference in its entirety.

BACKGROUND OF THE INVENTION

1. Field of the Invention

The present invention relates to an electric power circuit protecting apparatus which uses a superconductor for fault current limiting in an electric power system, and more particularly, to an electric power circuit protecting apparatus using a superconductor which is appropriately used in an environment needing a re-closing function of a circuit breaker within a predetermined time from a trip operation of the circuit breaker.

2. Description of the Background Art

In general, in an electric power system, a fault current limiter (FCL) serves to limit mechanical, thermal and electrical stress applied to a bus bar, an insulator and a circuit breaker, by reducing an electric current in generation of a fault current such as an electric shortage current. Therefore, there are increasing demands for the FCL which can limit the large fault current resulting from large electric power energy consumption in the electric power system. However, the development of the superconductor FCL applicable to the electric power system has been delayed due to technical difficulties and high cost.

With the development of a high temperature superconductor, it has been worth noticing of developing an superconductor FCL using a nonlinear voltage-current characteristic of the superconductor. In addition, a high temperature superconductor FCL using liquid nitrogen as a coolant has been developed since 1987.

When the fault current is generated in the electric power system, the superconductor connected to the electric power system is transited from a superconducting state which does not have an electric resistance to a resistor which has a high electric resistance in a short time, which is called a quench characteristic. The high temperature superconductor FCL uses this quench characteristics of the superconductor. Suggested are various types of superconductor FCLs, such as a resistor type FCL, an inductive type FCL and a hybrid type FCL.

On the other hand, in the countries in which many lines for power transmission or power distribution have been installed on the ground like Korea and Japan, when an accidental error or an one-time error occurs by exposure of the lines, in order to rapidly resume electric power supply, the circuit breaker is requested to be automatically re-closed after a predetermined time, for example, 0.3 to 1 second from circuit opening, namely, a trip operation. It is difficult to use the superconductor element as the FCL in the environment requiring the re-closing function of the circuit breaker within a predetermined time from the trip operation of the circuit breaker. In case the superconductor element is quenched from the superconducting state to the resistance state due to the fault current such as the electric shortage current on the lines for power transmission or power distribution (hereinafter, referred to as 'circuit'), it takes a much longer time than 1 second to supplement the coolant evaporated from the circumference of the superconductor element and cool the superconductor element in order to transit the resistance state to the superconducting state.

SUMMARY OF THE INVENTION

Therefore, an object of the present invention is to provide an electric power circuit protecting apparatus using a superconductor as an FCL which can satisfy the condition of an electric power system needing re-closing of a circuit within a predetermined time from fault current blocking.

Another object of the present invention is to provide an electric power circuit protecting apparatus using a superconductor as an FCL which can satisfy the above condition and cut down the production cost.

To achieve these and other advantages and in accordance with the purpose of the present invention, as embodied and broadly described herein, there is provided an electric power circuit protecting apparatus using a superconductor, comprising:

a main circuit breaker connected to an electric power supplying line, for electrically breaking the line when a fault current flows through the line, and re-closing the line after a predetermined time;

a first superconductor element connected in series to the main circuit breaker, maintained in a superconducting state when a current flowing through the line is normal, and quenched to have an electric resistance when the current flowing through the line is equal to or larger than a predetermined threshold current;

a first auxiliary switch connected between the first superconductor element and the main circuit breaker, and switchable to an open position or closed position of a circuit between the first superconductor element and the main circuit breaker;

a second superconductor element connected in parallel to the first superconductor element and the first auxiliary switch, and quenched to have an electric resistance when the current flowing through the line is equal to or larger than a predetermined threshold current;

a second auxiliary switch connected in series to the second superconductor element, connected in parallel to the first superconductor element and the first auxiliary switch, and switchable to an open position or closed position of a circuit between the second superconductor element and the main circuit breaker;

a first monitoring unit connected to the first superconductor element, for detecting a voltage across the first superconductor element according to a resistance variation of the first superconductor element, when the voltage across the first superconductor element is equal to or larger than a predetermined level, the first monitoring unit supplying a first switching control signal to the first auxiliary switch to be switched to the circuit open position, and a second switching control signal to the second auxiliary switch to be switched to the circuit close position; and a second monitoring unit connected to the second superconductor element, for detecting a voltage across the second superconductor element according to a resistance variation of the second superconductor element, when the voltage across the second superconductor element is equal to or larger than a predetermined level, the second monitoring trip unit supplying a second switching control signal to the second auxiliary switch to be switched to the circuit open position, and a first switching control signal to the first auxiliary switch to be switched to the circuit close position.

There is also provided an electric power circuit protecting apparatus using a superconductor, comprising:

a main circuit breaker connected to an electric power supplying line, for electrically breaking the line when a fault current flows through the line, and re-closing the line after a predetermined time;

a superconductor element connected in series to the main circuit breaker, maintained in a superconducting state when a current flowing through the line is normal, and quenched to have an electric resistance when the current flowing through the line is equal to or larger than a predetermined threshold current;

an auxiliary switch connected between the superconductor element and the main circuit breaker, and switchable to an open position or closed position of a circuit between the superconductor element and the main circuit breaker;

a reactor connected in parallel to the superconductor element and the auxiliary switch, for providing a bypassing path to a current flowing to the main circuit breaker, and limiting the current flowing through the path; and a monitoring unit connected to the superconductor element, for detecting a voltage across the superconductor element according to a resistance variation of the superconductor element, when the voltage across the superconductor element is equal to or larger than a predetermined level, the monitoring unit supplying a switching control signal to the auxiliary switch to be switched to the circuit open position.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a table showing open or close states of a main circuit breaker, a first auxiliary switch and a second auxiliary switch, when a normal current, a first fault current and a second fault current flow on a circuit, respectively.

DETAILED DESCRIPTION OF THE INVENTION

Figure 1A:
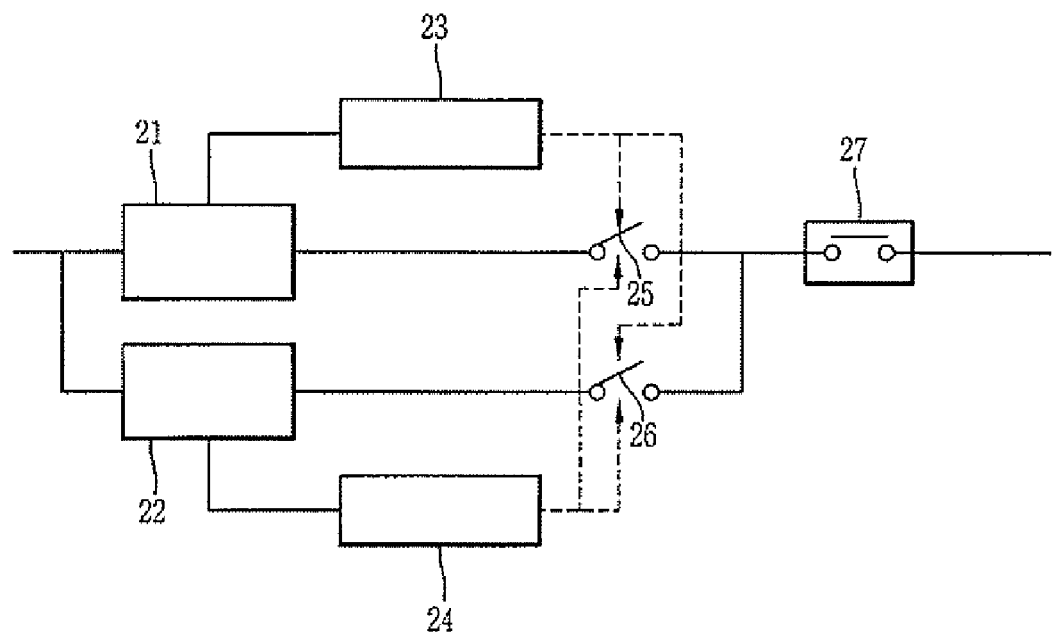
FIG. 1A is a block diagram illustrating an electric power circuit protecting apparatus using a superconductor in accordance with a first embodiment of the present invention.

Reference will now be made in detail to the preferred embodiments of the present invention, examples of which are illustrated in the accompanying drawings.

An electric power circuit protecting apparatus using a superconductor in accordance with a first embodiment of the present invention will now be explained with reference to FIG. 1A.

The electric power circuit protecting apparatus using the superconductor comprises a main circuit breaker 27 connected to an electric power supplying line and normally closed, for electrically breaking the line when an electric shortage current flows through the line, and re-closing the line after a predetermined time.

The voltage level used in an electric power system to which this invention is applied ranges from a few tens kV (Kilo Volts) to a few hundreds kV, so called a ultrahigh voltage. Therefore, a high voltage circuit breaker such as a vacuum circuit breaker can be preferably used as the main circuit breaker 27. The vacuum circuit breaker is easily available in the market.

A first superconductor element 21 included in the apparatus is connected in series to the main circuit breaker 27, maintained in a superconducting state when a current flowing through the line is normal, and quenched to have an electric resistance when the current flowing through the line is equal to or larger than a predetermined threshold current.

A first auxiliary switch 25 included in the apparatus is connected between the first superconductor element 21 and the main circuit breaker 27, and switchable to open position or closed position of a circuit between the first superconductor element 21 and the main circuit breaker 27.

A second superconductor element 22 included in the apparatus is connected in parallel to the first superconductor element 21 and the first auxiliary switch 25, and quenched to have an electric resistance when the current flowing through the line is equal to or larger than a predetermined threshold current.

In accordance with the first embodiment of the present invention, the predetermined threshold current of the first superconductor element 21 is substantially identical to the predetermined threshold current of the second superconductor element 22.

A second auxiliary switch 26 is connected in series to the second superconductor element 22, and also connected in parallel to the first superconductor element 21 and the first auxiliary switch 25. The second auxiliary switch 26 can be switched to position or closed position of a circuit between the second superconductor element 22 and the main circuit breaker 27.

The first auxiliary switch 25 is a normally closed switch and the second auxiliary switch 26 is a normally opened switch.

A first monitoring unit 23 is connected to the first superconductor element 21, for detecting a voltage across the first superconductor element 21 according to a resistance variation of the first superconductor element 21. When the voltage across the first superconductor element 21 is equal to or larger than a predetermined level, the first monitoring unit 23 supplies a first switching control signal to the first auxiliary switch 25 to be switched to the circuit open position, and a second switching control signal to the second auxiliary switch 26 to be switched to the circuit close position.

A second monitoring trip unit 24 is connected to the second superconductor element 22, for detecting a voltage across the second superconductor element 22 according to a resistance variation of the second superconductor element 22. When the voltage across the second superconductor element 22 is equal to or larger than a predetermined level, the second monitoring trip unit 24 supplies a second switching control signal to the second auxiliary switch 26 to be switched to the circuit open position, and a first switching control signal to the first auxiliary switch 25 to be switched to the circuit close position.

Figure 1B:
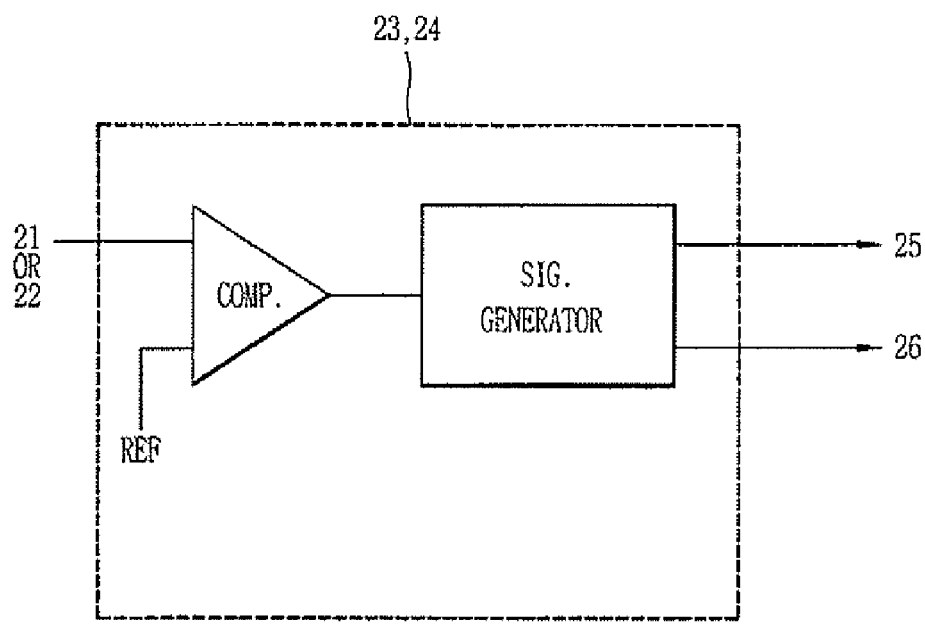
FIG. 1B is a schematic block diagram illustrating a detailed structure of a monitoring unit in accordance with the present invention.

As illustrated in FIG. 1B, the first and second monitoring trip units 23 and 24 each respectively include a comparator COMP. for comparing the detected voltage across the first superconductor element 21 with a predetermined reference voltage REF, and a signal generator SIG. GENERATOR for supplying the first and second switching control signals to the first and second auxiliary switches 25 and 26.

The operation of the electric power circuit protecting apparatus in accordance with the first embodiment of the present invention will now be described with reference to FIGS. 2, 1A and 1B.

FIG. 2 is a table showing the open and close states of the main circuit breaker 27, the first auxiliary switch 25 and the second auxiliary switch 26, when a normal current, a first fault current and a second fault current flow on a circuit, respectively.

When the normal current flows on the apparatus of FIG. 1A, especially, the electric power circuit on which the apparatus has been installed, the normal current flows in through the first superconductor element 21 which does not have a resistance, and flows out through the normally-closed first auxiliary switch 25 and the normally-closed main circuit breaker 27. Here, the normally-opened second auxiliary switch 26 is opened. Accordingly, when the normal current flows on the electric power circuit, current paths of the second superconductor element 22 and the second auxiliary switch 26 are blocked. FIG. 2 shows briefly the switching states of the main circuit breaker 27, the first auxiliary switch 25 and the second auxiliary switch 26 in case of the normal current.

In a state where a fault current such as a first electric shortage current is generated on the electric power circuit on which the apparatus has been installed, the operation of the apparatus will now be explained.

When the fault current is equal to or larger than the threshold current of the first superconductor element 21, the first superconductor element 21 is quenched to limit the fault current. The fault current limited by the first superconductor element 22 is completely blocked by a trip operation, namely, opening of the main circuit breaker 27.

In order to continuously supply electric power in generation of a temporary fault, the main circuit breaker 27 is re-closed within a predetermined time, for example, 0.3 to 1 second.

The first monitoring unit 23 which monitors the voltage across the first superconductor element 21 detects the voltage across the first superconductor element 21 according to the resistance variation of the first superconductor element 21, and compares the detected voltage with the predetermined reference voltage.

As the comparison result, if the voltage across the first superconductor element 21 is equal to or larger than the reference voltage, the first monitoring unit 23 supplies the first switching control signal to the first auxiliary switch 25 to be switched to the circuit open position and the second switching control signal to the second auxiliary switch 26 to be switched to the circuit close position.

The operation of the first monitoring unit 23 will now be explained with reference to FIG. 1B. When the normal current flows, there is no resistance. Therefore, the voltage across the first superconductor element 21 is zero. However, as described above, when the first fault current flows on the circuit over the threshold current of the first superconductor element 21, the first superconductor element 21 is quenched to have a resistance. Accordingly, the voltage across the first superconductor element 21 rises. The comparator COMP. of FIG. 1B compares the detected voltage across the first superconductor element 21 with the reference voltage predetermined to protect the first superconductor element 21. As the comparison result, if the detected voltage across the first superconductor element 21 is equal to or larger than the predetermined reference voltage, the comparator COMP. supplies, for example, a high level output signal to notify the result. The signal generator SIG. GENERATOR connected to the output of the comparator COMP. responding to this high level output signal generates and outputs the first switching control signal for opening the first auxiliary switch 25 and the second switching control signal for closing the second auxiliary switch 26. As a result, the first auxiliary switch 25 is opened and the second auxiliary switch 26 is closed.

Preferably, switching of the first and second auxiliary switches 25 and 26 is finished before re-closing of the main circuit breaker 27 after opening.

In accordance with the first embodiment of the present invention, the operation of the apparatus can be summarized as the switching states of the main circuit breaker 27, the first auxiliary switch 25 and the second auxiliary switch 26, when the first fault current flows as shown in FIG. 2.

Since the main circuit breaker 27 is re-closed, in the electric power supplying circuit, the current flows in through the second superconductor element 22, passes through the second auxiliary switch 26, and flows out through the main circuit breaker 27.

On the other hand, when a second temporary electric shortage current is generated on the electric power circuit after generation of the first temporary fault current or when the first fault current continuously flows on the circuit for a long time (permanent fault), the operation of the apparatus will now be described.

When the fault current flows over the threshold current of the second superconductor element 22, the second superconductor element 22 is quenched to limit the fault current, and the main circuit breaker 27 is opened to block the fault current.

In order to continuously supply electric power in generation of a temporary error, the main circuit breaker 27 is re-closed within a predetermined time, for example, 0.3 to 1 second.

When the second superconductor element 22 is quenched, the second monitoring unit 24 detects the voltage across the second superconductor element 22 according to the resistance variation of the second superconductor element 22, and compares the detected voltage with the predetermined reference voltage.

As the comparison result, if the voltage across the second superconductor element 22 is equal to or larger than the reference voltage, the second monitoring unit 24 supplies the first switching control signal to the first auxiliary switch 25 to be switched to the circuit close position and the second switching control signal to the second auxiliary switch 26 to be switched to the circuit open position.

When the second fault current is temporarily generated, the current flows in through the first superconductor element 21, passes through the first auxiliary switch 25, and flows out through the main circuit breaker 27.

When the second temporary fault current is generated after generation of the first fault current, the operation of the apparatus can be summarized as the switching states of the main circuit breaker 27, the first auxiliary switch 25 and the second auxiliary switch 26 as shown in FIG. 2.

In the case that the fault current is the permanent fault current sustained from generation of the first fault current, the main circuit breaker 27 is broken, re-closed within 0.3 to 1 second, re-broken, and maintained in the breaking state.

Accordingly, until the cause of the fault current is removed and the main circuit breaker 27 is manually restored to the electric current applying position, the electric power circuit is completely broken.

The structure and operation of an electric power circuit protecting apparatus using a superconductor in accordance with a second embodiment of the present invention will now be described with reference to FIG. 3. The differences between the electric power circuit protecting apparatuses of the first and second embodiments of the present invention will now be explained.

As compared with the apparatus of the first embodiment, the apparatus of the second embodiment does not include the second superconductor element 22, the second auxiliary switch 26 and the second monitoring unit 24, and additionally comprises a reactor 42.

Therefore, the structure and operation of the reactor 42 will now be mainly explained.

Figure 3:
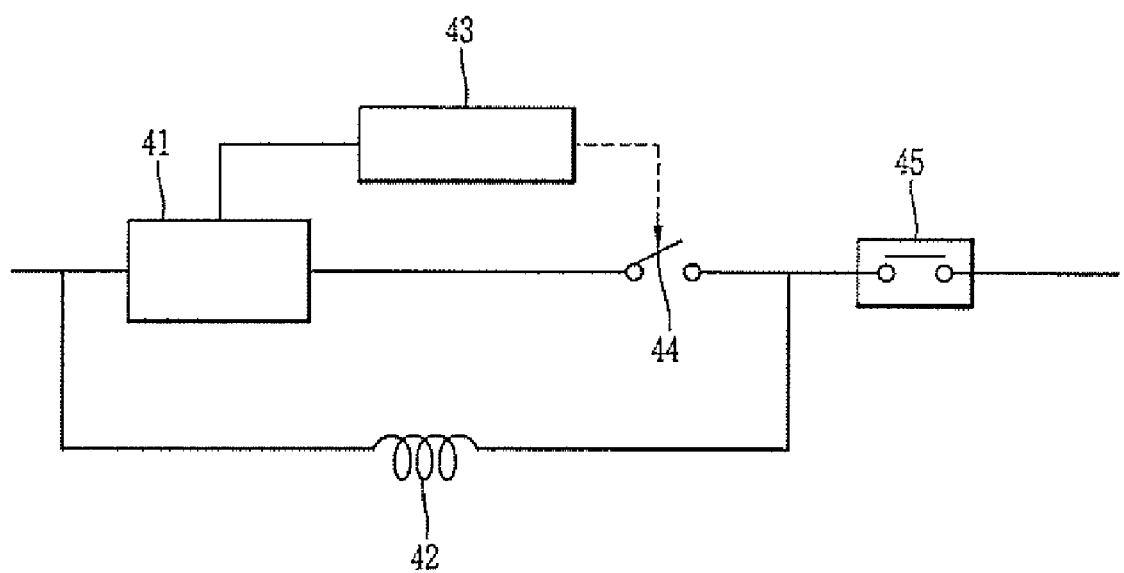
FIG. 3 is a block diagram illustrating an electric power circuit protecting apparatus using a superconductor in accordance with a second embodiment of the present invention.

In FIG. 3, reference numeral 41 denotes a superconductor element identical in structure and function to the first superconductor element 21 and the second superconductor element 22. Reference numeral 43 denotes a monitoring unit for protecting the superconductor element 41 by detecting a voltage across the superconductor element 41, comparing the voltage across the superconductor element 41 with a reference voltage, and opening an auxiliary switch 44 when the voltage across the superconductor element 41 is equal to or larger than the reference voltage. The monitoring unit 43 is identical in structure and function to the first monitoring unit 23 and the second monitoring unit 24.

In the same manner, the auxiliary switch 44 is identical in structure and function to the first auxiliary switch 25 and the second auxiliary switch 26.

The reactor 42 is connected in parallel to the superconductor element 41 and the auxiliary switch 44, for providing a bypassing path to a current flowing to the main circuit breaker 45, and limiting the current flowing through the path.

The reactor 42 can be replaced by any one of a resistor element, an inductive element and a capacitive element which serve to limit the current flowing through the path.

The operation of the electric power circuit protecting apparatus using the superconductor in accordance with the second embodiment of the present invention will now be explained.

When a first fault current is generated on an electric power circuit to which the apparatus has been connected, if the fault current is equal to or larger than a threshold current of the superconductor element 41, the superconductor element 41 is quenched to limit the fault current. The current limited by the superconductor element 41 is completely blocked by a trip operation, namely, opening of the main circuit breaker 45.

In order to continuously supply electric power in generation of a temporary error, the main circuit breaker 45 is re-closed within a predetermined time, for example, 0.3 to 1 second.

The monitoring unit 43 which monitors the voltage across the superconductor element 41 detects the voltage across the superconductor element 41 according to a resistance variation of the superconductor element 41, and compares the detected voltage with the predetermined reference voltage.

As the comparison result, if the voltage across the superconductor element 41 is equal to or larger than the reference voltage, the monitoring unit 43 supplies the switching control signal to the auxiliary switch 44 to be switched to the circuit open position.

Preferably, switching of the auxiliary switch 44 is finished before re-closing of the main circuit breaker 45 after opening. Because the main circuit breaker 45 is re-closed, in the electric power supplying circuit, the current flows in through the reactor 42 and flows out through the main circuit breaker 45.

On the other hand, when a second temporary electric shortage current is generated on the electric power circuit after generation of the first temporary fault current or when the first fault current continuously flows on the circuit for a long time (permanent fault), the operation of the apparatus will now be described.

Since the current path passing through the superconductor element 41 has been blocked, the fault current flows to the main circuit breaker 45 through the reactor 42 which is the bypassing path. The fault current is limited by the reactor 42 and finally blocked by the main circuit breaker 45.

Accordingly, when the fault current is temporarily generated, the current flows in through the reactor 42 and flows out through the main circuit breaker 27 without interruption.

In the case that the fault current is the permanent fault current sustained from generation of the first fault current, the main circuit breaker 45 is broken, re-closed within 0.3 to 1 second, re-broken, and maintained in the breaking state. Therefore, until the cause of the fault current is removed and the main circuit breaker 27 is manually reset to the electric current applying position, the electric power circuit is completely broken.

As discussed earlier, in accordance with the second embodiment of the present invention, as identical to the first embodiment, the electric power circuit protecting apparatus using the superconductor can re-close the circuit within the predetermined time from fault current blocking. In addition, the electric power circuit protecting apparatus comprises one superconductor element, and employs the current limiting element such as the reactor having the current limiting function as the parallel bypassing path, thereby cutting down the production cost.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An electric power circuit protecting apparatus using a superconductor, comprising:
   a main circuit breaker connected to an electric power supplying line, for electrically breaking the line when a fault current flows through the line, and re-closing the line after a predetermined time;
   a first superconductor element connected in series to the main circuit breaker, maintained in a superconducting state when a current flowing through the line is normal, and quenched to have an electric resistance when the current flowing through the line is equal to or larger than a predetermined threshold current;
   a first auxiliary switch connected between the first superconductor element and the main circuit breaker, and switchable to an open position or closed position of a circuit between the first superconductor element and the main circuit breaker;
   a second superconductor element connected in parallel to the first superconductor element and the first auxiliary switch, and quenched to have an electric resistance when the current flowing through the line is equal to or larger than a predetermined threshold current;
   a second auxiliary switch connected in series to the second superconductor element, connected in parallel to the first superconductor element and the first auxiliary switch, and switchable to an open position or closed position of a circuit between the second superconductor element and the main circuit breaker;

a first monitoring unit connected to the first superconductor element, for detecting a voltage across the first superconductor element according to a resistance variation of the first superconductor element, when the voltage across the first superconductor element is equal to or larger than a predetermined level, the first monitoring unit supplying a first switching control signal to the first auxiliary switch to be switched to the circuit open position, and a second switching control signal to the second auxiliary switch to be switched to the circuit close position; and a second monitoring unit connected to the second superconductor element, for detecting a voltage across the second superconductor element according to a resistance variation of the second superconductor element, when the voltage across the second superconductor element is equal to or larger than a predetermined level, the second monitoring trip unit supplying a second switching control signal to the second auxiliary switch to be switched to the circuit open position, and a first switching control signal to the first auxiliary switch to be switched to the circuit close position.

2. The electric power circuit protecting apparatus as claimed in claim 1, wherein the first monitoring unit comprises:

a comparator that compares the detected voltage across the first superconductor element with a predetermined reference voltage; and a signal generator that supplies the first switching control signal to the first auxiliary switch; and the second monitoring unit comprises:

a comparator that compares the detected voltage across the second superconductor element with a predetermined reference voltage; and a signal generator that supplies the second switching control signal to the second auxiliary switch.

3. The electric power circuit protecting apparatus as claimed in claim 1, wherein switching of the first and second auxiliary switches is finished before re-closing of the main circuit breaker.

4. The electric power circuit protecting apparatus as claimed in claim 1, wherein the predetermined threshold current of the first superconductor element is substantially identical to the predetermined threshold current of the second superconductor element.

* * * * *